G. B. FURMAN.
SECTIONAL DISTILLATION APPARATUS.
APPLICATION FILED AUG. 26, 1915.
1,265,318. Patented May 7, 1918.
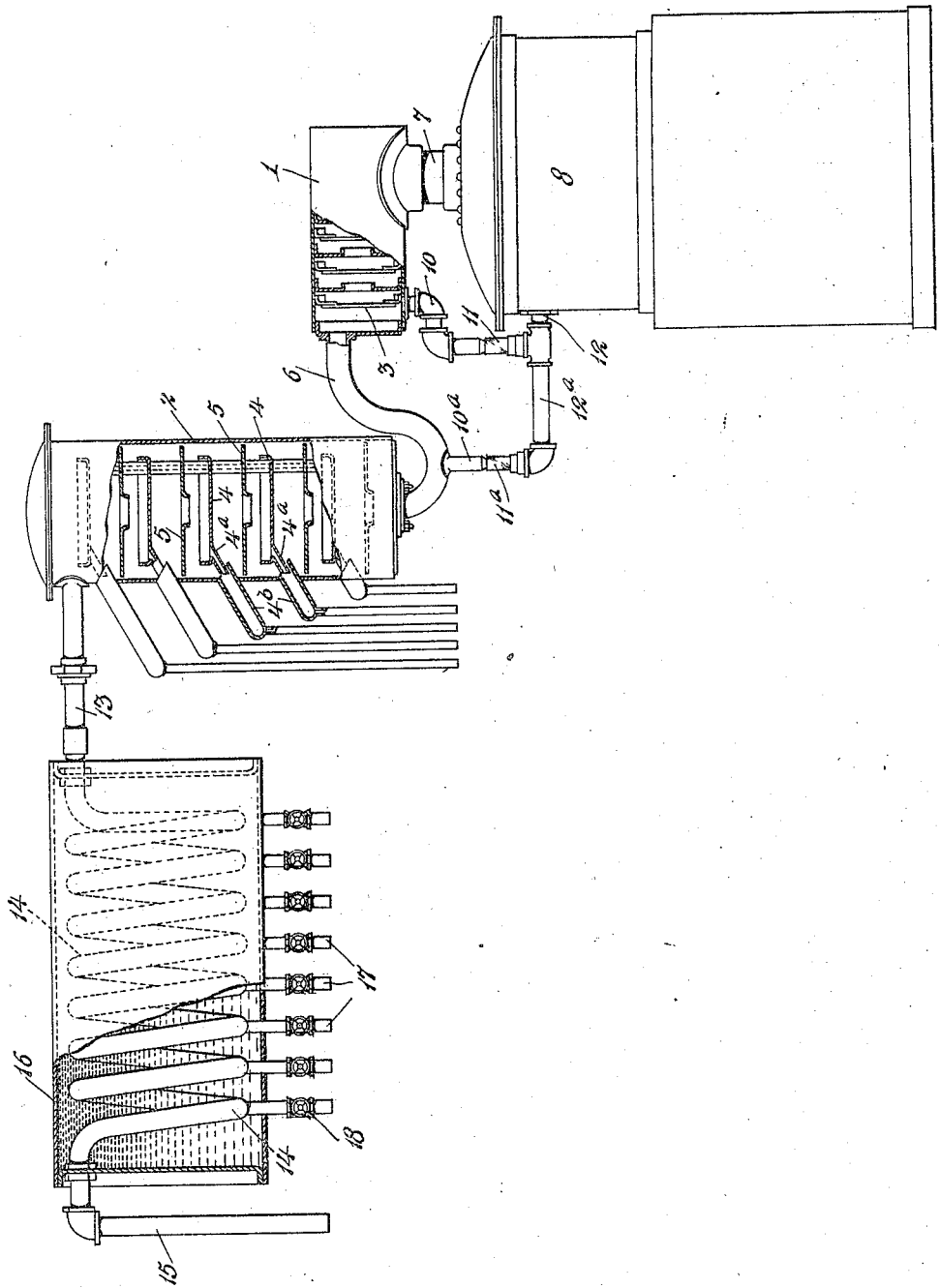

UNITED STATES PATENT OFFICE.

GEORGE B. FURMAN, OF EAST ORANGE, NEW JERSEY.

SECTIONAL DISTILLATION APPARATUS.

1,265,318.

Specification of Letters Patent.

Patented May 7, 1918.

Application filed August 26, 1915. Serial No. 47,411.

*To all whom it may concern:*

Be it known that I, GEORGE B. FURMAN, a citizen of the United States, and a resident of East Orange, county of Essex, State of New Jersey, have invented certain new and useful Improvements in Sectional Distillation Apparatus, of which the following is a specification.

My invention relates to distilling apparatus and has for its object to provide a sectional distillation apparatus having all of the advantages of the customary column still and in which the disadvantages usually present in such structures are entirely avoided. The particular purpose of my improvement is to construct the distilling apparatus of the column type in a compact manner so as to permit of its installation in a minimum of space without in any way interfering with its efficiency and operation. My invention will be fully described hereinafter and the features of novelty will be pointed out in the appended claims.

Reference is to be had to the accompanying drawing which by way of example illustrates a diagrammatic representation of my improvement.

As shown in the illustrated example the apparatus comprises two separators or columns 1 and 2 arranged in any suitable manner for instance as in the drawing in which the separator 1 is located in a horizontal position while the separator 2 is in an upright position. It will be understood that this arrangement of the separators is not arbitrary and that the horizontal separator may be disposed for instance at an inclination to the horizontal without in any way departing from the present inventive idea. The separator 1 which may be of any suitable construction, as illustrated, comprises a closed tank divided into a series of compartments by means of perforated plates or baffles 3 which in the present instance are upright owing to the position of the separator 1. The separator 2 which may also be of any convenient construction is shown as provided with internal, superimposed pans 4 between each pair of which apertured plates 5 are arranged. In the illustrated example each pan 4 is provided with an individual outlet $4^a$ each communicating with an outlet tube $4^b$ extending exteriorly of the separator 2. The separators 1 and 2 are connected with each other preferably in series by means of a pipe 6 which communicates with the end of the separator 1 and then extends downwardly and has its lower end curved upwardly and in communication with the lower end of the separator 2. The separator 1 is further connected by means of a tube 7 with the upper end of a still or boiler 8 which may comprise any suitable construction adapted to convert the liquid to be distilled into vapor or steam.

The separator 1 is further provided with a return outlet 10 which has its exit end in communication for instance with a glass tube 11 which in turn is connected with a pipe 12 leading back to the still 8. In addition to this the pipe 6, preferably at the lower bend thereof is provided with a similar outlet $10^a$ having its exit end preferably extending into a similar glass tube $11^a$ which in turn communicates with a pipe $12^a$ connected with or forming a continuation of the pipe 12. With this arrangement a return circuit is provided between the separator 1, the bend of the pipe 6 and the still 8. A pipe 13 extends from the upper portion of the separator 2 and is connected with one end of a condensing coil 14, the other end of which communicates with an outlet tube or other withdrawing means 15, said coil 14 being located in a condensing tank 16 containing a cooling agent of any kind such as water, which surrounds the said coil in the usual manner. In the arrangement shown the tank 16 is located in a horizontal position with each convolution of the coil 14 provided with an outlet tube 17 controlled by a valve 18 or any other suitable device.

In operation the liquid to be distilled is introduced into the boiler or still 8 and is converted into a vapor or steam therein, the steam or vapor from said still 8 passing through the tube 7 into the separator 1 near its one end. The said steam or vapor passes along the said separator 1 and through the perforated plates 3 therein and finally passes out of said separator 1 and flows through the pipe 6 into the separator 2 at the bottom thereof. The said steam or vapor now rises in the separator 2 around the pans 4 and through the apertured plates 5 therein and such portions thereof as remain uncondensed when the top of the separator 2 is reached, finally pass through the pipe 13 into the coil 14 in which final condensation of the steam or vapor takes place and from which such steam or vapor as still remains uncondensed passes off through the pipe 15. As the steam or vapor rises in the separator 2 the constituents thereof will become successively condensed at the various levels therein and the various products of condensation will collect in the different pans 4 from each of which these products may be separately withdrawn through the outlets 4$^b$ as may be desired, in the usual manner. With this arrangement it is possible to separately withdraw the products of condensation at different levels. As before stated such steam or vapor as remains uncondensed at the top of the separator 2 passes through the pipe 13 to the coil 14. As the steam or vapor impacts against the plates 3 in the separator 1 it will become partially condensed, the products of condensation finally passing through the return outlet 10, tube 11 and pipe 12 back to the still or boiler 8. Similarly any products of condensation collecting at the bottom of the separator 2 will pass out of same into the lower bend of the pipe 6 and will be carried away from this point through the outlet 10$^a$ to the tube 11$^a$ and pipe 12$^a$ back to the still or boiler 8. Any condensation which may occur in the pipe 6 will also be carried off through said outlet 10$^a$, tube 11$^a$ and pipe 12$^a$ back to the still 8. Owing to the fact that the diameter of the connection 10$^a$ is less than that of the pipe 6 any tendency of the vapor to pass from the still 8 through the connection 10$^a$ will be resisted; in some cases with the pipe 6 shaped as in the illustration or in an equivalent manner, this difference of diameter permits the condensate to form a seal in said pipe 6 because of the fact that said condensate is formed more quickly than it can be carried off through the connection 10$^a$. In either case the travel of the vapor in the intended path is assured.

As the steam or vapor passes successively through the separators 1 and 2 complete separation or purification takes place in the same manner as in the customary column still which usually must be of a considerable height in order to properly perform its functions. The products of distillation which result from the process, as before stated, may be withdrawn, through any of the outlet tubes 17 from any one of the convolutions of the coil 14, whereby different products resulting from the different temperatures existing in the condensing tank 16 may be recovered. It will be understood that the temperature is highest in the tank 16 at the right hand end owing to the fact that the hottest vapor or steam is introduced at this point and that said temperature decreases toward the opposite end of said tank. The outlet 10$^a$, tube 11$^a$ and pipe 12$^a$ together with the pipe 12 serve as a drain in the connecting medium between the separators and thus automatically prevent interference with the process at this point by returning products of condensation and any foreign or solid matter which may collect back to the still. The result is that the process is just as efficiently carried out as it would be in a column still having a height equal to the combined height of all of the separators included in the apparatus. It will, of course, be understood that in some cases additional separators preferably connected in series as described may be provided if necessary or desired and further that the separators may be arranged with their major axes extending in other directions than those illustrated, the separator 1 being preferably arranged in a horizontal position simply because initial condensation of the steam or vapor is more readily brought about by having said steam or vapor flow in a substantially horizontal direction and impact against upright plates instead of being forced against plates otherwise arranged. In any case it will be seen that my apparatus is compact in arrangement and of reasonable dimensions so that it may be placed in any ordinary location without requiring a housing or protecting structure of extreme height. For instance my improved arrangement may be installed on any single floor of a building instead of requiring it to extend through several floors as is ofttimes the case with existing column stills. My apparatus is capable of distilling any liquids and may be used as a substitute for a column still and in a variety of other ways which will be at once apparent.

Various changes in the specific form and arrangement shown and described may be made within the scope of the claims without departing from the spirit of my invention.

I claim:

1. A distillation apparatus comprising a still, a plurality of separators, a connection between the first separator and said still, a connection between two adjacent separators, a condenser operatively connected with the last separator and a return connection between said still and the connection between two adjacent separators whereby any condensate or the like in said return connection is conducted back to the still before it passes to a separator beyond the first separator.

2. A distillation apparatus comprising a plurality of separators, a connecting pipe extending from one separator to the bottom of the next adjacent separator, a still, a tube connecting the top of said still with the first separator, a condenser, a pipe connecting the top portion of the last separator with said condenser, a return connection from the first separator to the still and another connection extending from the connecting pipe between two adjacent separators to said return connection.

In testimony whereof, I have hereunto set my hand.

GEORGE B. FURMAN.